(12) United States Patent
Moeller et al.

(10) Patent No.: US 8,118,968 B2
(45) Date of Patent: Feb. 21, 2012

(54) TWO-COMPONENT BONDING AGENT

(75) Inventors: Thomas Moeller, Duesseldorf (DE); Hans-Georg Kinzelmann, Pulheim (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 770 days.

(21) Appl. No.: 11/620,952

(22) Filed: Jan. 8, 2007

(65) Prior Publication Data

US 2007/0151666 A1 Jul. 5, 2007

Related U.S. Application Data

(63) Continuation of application No. PCT/EP2005/006455, filed on Jun. 16, 2005.

(30) Foreign Application Priority Data

Jul. 22, 2004 (DE) .......................... 10 2004 035 542

(51) Int. Cl.
| | |
|---|---|
| C04B 37/00 | (2006.01) |
| C08F 290/14 | (2006.01) |
| C08G 63/48 | (2006.01) |
| C08G 63/91 | (2006.01) |
| C08G 18/81 | (2006.01) |
| C08G 64/00 | (2006.01) |
| C07C 211/00 | (2006.01) |

(52) U.S. Cl. ............ 156/325; 525/50; 528/45; 528/196; 564/367

(58) Field of Classification Search ................... 525/50; 528/45, 196; 564/367
See application file for complete search history.

(56) References Cited

U.S. PATENT DOCUMENTS

| | | | |
|---|---|---|---|
| 3,072,613 A | 1/1963 | Whelan, Jr. et al. | |
| 3,084,140 A | 4/1963 | Gurgiolo et al. | |
| 3,624,016 A | 11/1971 | Lew | |
| 4,616,066 A | 10/1986 | Tominaga | |
| 4,806,611 A | 2/1989 | Hoenel et al. | |
| 4,835,289 A | 5/1989 | Brindoepke | |
| 4,883,853 A | 11/1989 | Hobes et al. | |
| 4,892,954 A | 1/1990 | Brindoepke et al. | |
| 5,132,458 A | 7/1992 | Hoenel et al. | |
| 5,677,384 A | 10/1997 | Detering et al. | |
| 5,977,262 A | 11/1999 | Anderson | |
| 5,977,266 A | 11/1999 | Reil et al. | |

FOREIGN PATENT DOCUMENTS

| | | |
|---|---|---|
| DE | 3600602 | 7/1986 |
| DE | 3529263 | 2/1987 |
| DE | 3727497 | 2/1989 |
| EP | 0328150 | 2/1989 |
| EP | 1020457 | 7/2000 |
| WO | WO 84/03701 | 9/1984 |
| WO | WO 94/29422 | 12/1994 |
| WO | WO 98/50345 | 11/1998 |
| WO | WO 02/079148 | 10/2002 |

OTHER PUBLICATIONS

Lee, Henry and Neville, Kris; "Aliphatic Primary Amines and Their Modifications as Epoxy-Resin Curing Agents"; *Handbook of Epoxy Resins*, Ch. 7, pp. 7-1 to 7-33, McGraw Hill Book Company, NY (1967).

Lee, Henry and Neville, Kris; "Amides and Miscellaneous Nitrogen Compounds as Epoxy-Resin Curing Agents"; *Handbook of Epoxy Resins*; Ch. 10, pp. 10-1 to 10-23, McGraw Book Company, NY (1967).

*Primary Examiner* — Philip Tucker
*Assistant Examiner* — Michael Orlando
(74) *Attorney, Agent, or Firm* — Sun Hee Lehmann

(57) ABSTRACT

A bonding agent system is provided that contains at least components (A) and (B), where (A) is at least one compound with at least two cyclic carbonate groups and (B) is at least one compound with at least two primary and/or secondary amine groups. The bonding agent system is particularly suitable for use as a two-component adhesive or sealant and has very good adhesion to various substrates.

23 Claims, No Drawings

US 8,118,968 B2

TWO-COMPONENT BONDING AGENT

CROSS-REFERENCE TO RELATED APPLICATIONS

This application is a continuation under 35 U.S.C. §365(c) and 35 U.S.C. §120 of international application PCT/EP2005/006455, filed 16 Jun. 2005, and published 2 Feb. 2006 as WO 2006/010408, which is incorporated herein by reference in its entirety. This application also claims priority under 35 U.S.C. §119 of DE 10 2004 035 542.8, filed 22 Jul. 2004, which is incorporated herein by reference in its entirety.

FIELD OF THE INVENTION

The present invention relates to a bonding agent system, comprising at least components (A) and (B), in which is comprised a compound with at least two cyclic carbonate groups, or a mixture of two or more compounds with at least two cyclic carbonate groups as component (A) and a compound with at least two (—NHR—)-atom groupings, or a mixture of two or more compounds with at least two (—NHR—)-atom groupings as component (B), as well as the use of a bonding agent system as an adhesive/sealant and the use of this adhesive/sealant.

DISCUSSION OF THE RELATED ART

Two-component bonding agent systems, particularly based on polyols and NCO-terminated compounds, have long been known in the prior art. They are employed, for example in the metal working industry, the automobile industry, the electrical industry, the packaging industry or the building industry as adhesives, sealants, fillers or castings. A disadvantage of the polyurethanes with NCO groups used as "curing agents" is the moisture sensitivity. Consequently, suitably sealed packaging has to be used for storing these compounds. Once opened, containers usually have to be used up immediately or quickly in order to avoid any loss in quality. Generally, the polyol components have to be carefully dried prior to mixing with the curing agents, because otherwise, any residual moisture can lead to the formation of unwanted bubbles in the adhesive film, which under certain circumstances can be disadvantageous for the final application. A further disadvantage for at least some bonding agent systems based on two-component polyurethane adhesives, is the toxicity of monomeric isocyanates, in particular highly volatile and/or easily migratable monomeric diisocyanates, in the curing components. The use of products containing a high content of highly volatile diisocyanates requires the user to implement costly protective measures in the workplace, in particular to maintain clean and breathable air, the maximum legally permitted concentration of handled materials as gas, vapor or particulate matter in the air at the workplace being specified (in Germany, for example; by the annually updated "MAK-Wert-Liste der Technischen Regel TRGS 900 des Bundesministeriums för Arbeit und Soziales"). However, free monomeric polyisocyanates can also migrate into the coating or adhesive bond, or even partially into the coated or glued materials. Such migrating ingredients are commonly called "migrates" by technical specialists. On contact with moisture, the isocyanate groups of the migrates are continuously reacted to amino groups.

Migrates are highly undesirable in the packaging industry and particularly in the packaging of foods. On the one hand, the passage of the migrates through the packaging material can lead to contamination of the packaged product; on the other hand, long waiting times are necessary before the packaging material is "migrate-free" and can be used.

Another unwanted effect, which can be caused by the migration of monomeric diisocyanates, is the so-called anti-sealing effect in the production of bags or carrier bags from laminated plastic films. The laminated plastic films often contain slip agents based on fatty acid amides. By reaction of migrated monomeric polyisocyanate with the fatty acid amide and/or moisture, urea compounds with a melting point above the sealing temperature of the plastic films are formed on the surface of the film. This leads to the formation between the films to be sealed of a "foreign" layer, which hinders the formation of a homogeneous sealing seam.

Products based on compounds with cyclic carbonate groups and aliphatic polyamines are known in principle.

U.S. Pat. No. 3,072,613 describes resinous polyurethane products that can be used as adhesives and which are obtained from the reaction of a multifunctional cyclic carbonate with a polyfunctional amine at a temperature $\geqq 0°$ C. and exhibit a reduced viscosity of $\geqq 0.12$ as the 0.2 wt. % solution in dimethyl formamide. The multifunctional cyclic carbonates are obtained from the reaction of monomeric compounds, for example from the reaction of hexamethylene diisocyanate with glycerine carbonate, diglycerine with diethyl carbonate or 2,2-propylene-bis-(4-phenol)-diepoxide with ethylene carbonate. The polyfunctional amines possess 2 to 4 amino groups and an aliphatic hydrocarbon backbone with 2 to 20 carbon atoms.

U.S. Pat. No. 4,883,853 describes polyurethanes that can be employed as adhesives, obtained from the reaction of urethane polyol with polyisocyanate, wherein the urethane polyol can be obtained from the reaction of polyfunctional amines with ethylene carbonate.

U.S. Pat. No. 5,977,262 describes a process for the manufacture of hydroxyurethanes from cyclic carbonates with primary amines in the presence of catalytic amounts of a base, whose corresponding acid has a pKa value $\geqq 11$.

WO 02/079148 describes a process for the manufacture of carbonate-urethane compositions from the reaction in a solvent of monomeric polyisocyanates with cyclic carbonates that contain hydroxyl groups, and in the presence of a base. The carbonate-urethane compositions react with an excess of diamine with ring opening of the carbonate ring, and serve as amino group-containing epoxide crosslinkers.

The object of the present invention was to provide a bonding system that exhibits at least as good product properties as a two-component bonding system based on compounds containing isocyanate groups and polyols, but without having the disadvantages of this type of system. In particular, the systems should exhibit good adhesion/sealing properties.

BRIEF SUMMARY OF THE INVENTION

The present invention provides a bonding agent system comprising at least the components (A) and (B), in which is comprised:
a) a compound with at least two cyclic carbonate groups, or a mixture of two or more compounds with at least two cyclic carbonate groups, as component (A) and
b) a compound with at least two (—NHR—)-atom groupings, or a mixture of two or more compounds with at least two (—NHR—)-atom groupings, as component (B), with R=H, an alkyl group or aryl group;
wherein component (A) has an average molecular weight ($M_n$) of $\geqq 1000$ g/mol.

DETAILED DESCRIPTION OF CERTAIN EMBODIMENTS OF THE INVENTION

The upper limit of the molecular weight ($M_n$) of component (A) is ca. 10,000,000 g/mol. Preferably, component (A) has an average molecular weight ($M_n$) of 1500 g/mol to 100 000 g/mol, particularly preferably from 2000 g/mol to 50 000 g/mol.

The following definitions apply in the description
(a) a primary amine group is an atomic grouping of the type "—$NH_2$" (R=H),
(b) a secondary amine group is an atomic grouping of the type "—NHR" and
(c) a tertiary amine group is an atomic grouping of the type "$R_3N$".

In the context of the invention, an amino group is understood to mean an atomic grouping of the type "—$NH_2$". It was surprisingly found that bonding agent systems of this type are suitable adhesives/sealants and are distinguished by a very good adhesion to surfaces of the most varied materials. The essentially NCO group-free polyurethane adhesives/sealants can be used alone or as a solution in common organic solvents. "Essentially free of NCO groups" means that the NCO content in component (A) is <0.1 wt. %.

The molecular weights given in the present text refer to number average molecular weights ($M_n$), unless otherwise stipulated. All molecular weight data refer to values obtained by gel permeation chromatography (GPC), unless otherwise stipulated.

Any polymers can be used as the compound with at least two cyclic carbonate groups, in so far as the criterion of molecular weight is respected and that they do not have any other functional groups that could interfere with the reaction with component (B). The at least one compound with at least two cyclic carbonate groups can be either linear or also branched.

The cyclic carbonate groups of component (A) are preferably located at the ends of the polymer chains, however in some cases, compounds may also be used as component (A), which comprise these groups statistically distributed over the whole polymer chain. The cyclic carbonate groups can either form part of the main chain or also be located in side chains.

Component (A) is preferably a polymer carrying a cyclic carbonate group, wherein the polymer is selected from the group of fat chemical compounds, polyethers, polyether polyols, polyesters, polyester polyols, polycarbonates, polycarboxylic acids, polyacrylates, polymethacrylates, polyamides, polyamines, polyurethanes or mixtures thereof. The fat chemical compounds are preferably castor oil or dimer diol, which have been alkoxylated.

Polyamides used as the component A are understood to be those that do not have NH groups.

Cyclocarbonates are understood to be structures in which a carbonic ester group is part of a ring structure according to Formula (I):

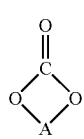

(I)

in which:
$A=(C(R^1R^2))_n$ with $n \geq 2$, preferably n=2 or 3, particularly preferably n=2; $R^1$, $R^2=$ a) hydrogen atom, a saturated or unsaturated, straight-chain or branched chain or cyclic, aromatic or arylaliphatic, optionally substituted hydrocarbon group with 1 to 12 carbon atoms, or
b) ether group with 1 to 12 carbon atoms and up to 3 oxygen atoms or
c) $R^3X$, wherein $R^3$ is a divalent aliphatic, cycloaliphatic, aromatic, arylaliphatic or ether-containing optionally substituted hydrocarbon group with 1 to 20 carbon atoms and X is hydroxy-, epoxy, carboxylic acid-, carboxylic acid ester group, or
d) Z, wherein Z is an unsaturated polymerizable group, especially a vinyl-, (meth)acrylic-, maleic acid-, fumaric acid-, itaconic acid- or crotonic acid-ester-group and wherein $R^1$ and $R^2$ can be identical with one another or different.

Specific examples of cyclocarbonates are: ethylene carbonate (1,3-dioxolane-2-one); propylene carbonate (4-methyl-1,3-dioxolane-2-one); glycerine carbonate (4-methylhydroxy-1,3-dioxolane-2-one); 5-ethyl-5-(hydroxymethyl)-1,3-dioxane-2-one; 1,3-dioxane-2-one; 5-((allyloxy)methyl)-5-ethyl-1,3-dioxane-2-one; and 1,3-dioxepine-2-one. Cyclic carbonates that carry epoxide groups are described, for example, in DE 3726497 A1.

Cyclic carbonates are obtained, for example, by the transesterification of the esters of carbonic acid, such as, e.g., dimethyl carbonate, diethyl carbonate, diphenyl carbonate, ethylene carbonate or propylene carbonate with polyols, wherein the polyols preferably carry at least four hydroxyl groups, each two of which react with carbonic acid esters by transesterification to afford cyclic five-membered or six-membered ringed carbonates. Exemplary polyhydric polyols include: diglycerine, triglycerine, polyglycerine, sugar alcohols (e.g., xylitol, mannitol, erythritol), di- and trimethylolpropane, di- and trimethylolethane, pentaerythritol, dipentaerythritol. Here, diglycerine is particularly preferred. The cyclic carbonates are manufactured from the polyols according to current methods known to the person skilled in the art, in particular by reacting the polyols with the carbonates in a stoichiometric ratio of 1.0:1.0 to 1.0:10.0 (ratio of 1,2- or 1,3-glycol groups to carbonate groups), particularly in the presence of a catalyst. The catalyst include e.g. basic catalysts, such as, for example: carbonates, bicarbonates, alcoholates, carboxylates, hydroxides or oxides of alkali metals and alkaline earth metals, and also Lewis acids, such as, e.g. organic compounds of di- or tetravalent tin or titanium, for example tin-(II)-octoate, tin-(II)-laurate, dibutyltin oxide or tetrabutyl titanate. The catalysts can be added, for example, in amounts of 0.01 to 1.0 wt. %, based on the polyol and carbonic acid ester.

Cyclic carbonates can also be obtained by transesterifying carbon dioxide with epoxy compounds using known techniques. Reactions of this type are described, for example, in WO 84/03701, DE-A 3529263 or DE-A 3600602. Both aliphatic and aromatic cyclic carbonates can be obtained from the reaction of polyols with phosgene (e.g., U.S. Pat. No. 3,624,016).

The provision of at least two cyclic carbonate groups to the polymer, hereinafter called functionalization, can be effected during the synthesis of the polymer chain, wherein suitable monomers that contain cyclocarbonate groups are employed. However, it is preferred to functionalize an already prepared polymer. For this, the addition of cyclic hydroxyalkyl carbonates to polymers carrying anhydride groups or isocyanate groups is particularly preferred. Basically, a suitable process is described in EP 0328150 A2. Cyclic hydroxyalkyl carbonates with 5- or 6-membered carbonate rings are preferred for the addition reaction. Glycerine carbonate is quite particularly preferred.

Similarly, it is possible to incorporate such cyclic hydroxyalkyl carbonates by transesterification. Here, $C_1$-$C_4$-alkyl ester groups of the polymer can be reacted directly, for example, or it is also possible to react hydroxyl groups of the polymer with an ester group of a low molecular weight. $C_2$ to $C_6$ dicarboxylic acid ester and then react the remaining $C_1$-$C_4$ alkyl ester groups with a hydroxyalkyl carbonate. Low molecular weight dicarboxylic acid esters are understood to mean those with a dicarboxylic acid moiety containing 2 to 44 carbon atoms, preferably 2 to 12 carbon atoms, particularly preferably 2 to 6 carbon atoms and can exhibit a linear or branched aliphatic, cycloaliphatic or aromatic structure. A further possibility of incorporating hydroxyalkyl carbonates is through their reaction with acid halides, particularly carbonic acid halides. In a further preferred embodiment of the invention, compounds are employed as component (A), which are obtained by the addition of carbon dioxide to epoxide group-containing polymers. An addition process of this type is described in principle in DE-OS 3529263 and DE-OS 3600602.

By choosing the component (A) and functionalization with the cyclic carbonate groups, it is possible to obtain polymers that comprise urethane groups or only ester groups. The viscosity of the polymer can be influenced in this manner. In a further embodiment of the invention, a further low molecular weight component (A1), exhibiting cyclic carbonate groups, can be comprised in the bonding agent system. This component should have a molecular weight <1000 g/mol, preferably <800, and comprise at least two cyclic carbonate groups. For example, they can be diepoxides reacted with $CO_2$ or di- or tricarboxylic acid esters that were reacted at the ester groups with the abovementioned hydroxyfunctional cyclic carbonates. Components of this type are also called reactive diluents and can be added to modify the viscosity of the bonding agent system, for example, in amounts of up to 60 wt. %, preferably up to 25 wt. %, based on (A).

The inventive bonding agent system comprises besides the component (A) at least one compound with at least two (—NHR—)-atom groupings, or a mixture of two or more compounds with at least two (—NHR—)-atom groupings as component (B), with R=H, an alkyl group or aryl group. Component (B) exhibits as the component (B1) an average molecular weight ($M_n$) of 60 g/mol to 500 g/mol, preferably 60 g/mol to 300 g/mol or as component (B2) an average molecular weight ($M_n$) of $\geqq 500$ g/mol, wherein component (B) is present as either component (B1) or (B2) or as a mixture of (B1) with (B2). The weight ratio of (B1) to (B2) in the added mixture of (B1) with (B2) is 0.5:20 to 20:0.5. The upper limit of the molecular weight ($M_n$) of component (B2) is ca. 5,000,000 g/mol. Preferably, component (B2) has an average molecular weight ($M_n$) of 800 g/mol to 2,000,000 g/mol, particularly preferably from 1000 g/mol to 1,500,000 g/mol.

The inventively employed component (B) can be either linear or branched. The molecular backbone of component (B) can comprise aliphatic, aromatic, aliphatic-aromatic, cycloaliphatic and heterocyclic structures. Primary and/or secondary and tertiary amines can be present in the molecule, however at least two (—NHR—) atom groupings, preferably two amino groups must be included. The amine functions themselves are aliphatic, i.e., the carbon atoms directly neighboring the amine nitrogen are not part of an aromatic ring structure.

The inventively added component (B1) is added as the sole component or also as a mixture of the suitable employable compounds as the component (B1).

Component (B1) is preferably selected from the group of the alkylene diamines and/or cycloalkylene diamines.

Alkylene diamines are understood to mean compounds of the general formula $R^4R^5N$—Z—$NR^6R^7$, in which $R^4$, $R^5$, $R^6$, $R^7$ independently of one another can be H, alkyl or cycloalkyl groups. Z means a linear or branched, saturated or unsaturated alkylene chain containing $\geqq 2$ carbon atoms. Preferred examples are diaminoethane, diaminopropane, 1,2-diamino-2-methylpropane, 1,3-diamino-2,2-dimethylpropane, diaminobutane, diaminopentane, 1,5-diamino-2-methylpentane, neopentyldiamine, diaminohexane, 1,6-diamino-2,2,4-trimethylhexane, 1,6-diamino-2,4,4-trimethylhexane, diaminoheptane, diaminooctane, diaminononane, diaminodecane, diaminoundecane, diaminododecane, dimeramine (commercially available, for example under the trade name Versamin 551 from Cognis), triacetonediamine, dioxadecanediamine, N,N-bis(3-aminopropyl)-dodecylamine (commercially available, for example under the trade name Lonzabach 12.30 from Lonza) or mixtures thereof.

Cycloalkylene diamines are understood to mean compounds of the general formula $R^8R^9N$—$YNR^{10}R^{11}$ in which $R^8$, $R^9$, $R^{10}$, $R^{11}$ independently of one another can be H, alkyl or cycloalkyl groups. Y means a saturated or unsaturated cycloalkyl group containing $\geqq 3$ carbon atoms, preferably $\geqq 4$ carbon atoms. Diaminocyclopentanes, diaminocyclohexanes, diaminocycloheptanes, for example 1,4-cyclohexanediamine; 4,4'-methylene-bis-cyclohexylamine, 4,4'-isopropylene-bis-cyclohexylamine, isophoronediamine, m-xylylenediamine, N-aminoethylpiperazine or mixtures thereof are preferred.

The diamines can also comprise both alkyl as well as cycloalkyl groups together. Preferred examples are aminoethylpiperazine, 1,8-diamino-p-menthane, isophoronediamine, 1,2-(bisaminomethyl)-cyclohexane, 1,3-(bisaminomethyl)-cyclohexane, 1,4-(bisaminomethyl)-cyclohexane, bis-(4-aminocyclohexyl)-methane. Further examples of inventively employable diamines as the component (B1) are bis-(6-aminohexyl)-amine, α,α-diaminoxylenes, etc.

Preferably, polyfunctional amines are employed as the component (B1) and/or component (B2). In particular, these are amino functionalized polyalkylene glycols, such as 1,2-bis-(aminoethoxy)-ethane, 1,13-diamino-4,7,10-trioxatridecane. Inventively employable aminofunctional polyalkylene glycols are commercially available, for example, as Jeffamine® from the Huntsman Corp. Jeffamine® D-230, D-400, D-2000, D-4000, T-403, T-3000, T-5000, ED-600, ED-2003 are preferred. Similarly preferred polyfunctional amines that can be employed as component (B1) and/or component (B2) are compounds of the general formula $H_2N$—$(CH_2CH_2$—$NH)_x$—$CH_2CH_2$—$NH_2$, with $2 \leqq x \leqq 10$, such as, e.g., diethylenetriamine, triethylenetetramine, tetraethylenepentamine, pentaethylenehexamine, dipropylenetriamine, bis-(3-aminopropyl)-amine, N,N-bis(3-aminopropyl)-ethylenediamine, bishexamethylenetriamine, heptaethyleneoctamine and the like.

Preferably, polymers are employed as component (B2), which are selected from the group of the polyamines, polyimines, polyethers, polyamides, polyamino amides, polyurethanes, polyolefines, polyvinylamines or mixtures thereof.

Polyamines that can be used as component (B2) are described by Henry Lee and Kris Neville, Handbook of epoxy resins, chapter 7, pages 7-1 to 7-33, McGraw-Hill Book Company, New York 1967 and references cited therein, as well as by Clayton A. May, Epoxy Resins, pages 466-468, Marcel Dekker, New York 1988 and references cited therein.

Preferred polyimines are polyethylene imine. The amine hydrogen functions of polyethylene imine can also be partially modified, for example by alkylation, benzylation, acetylation, alkoxylation, preferably ethoxylation or propoxylation. Modification with epichlorohydrin is particularly preferred. Preferred polyethylene imines are commercially available from BASF under the trade name Lupasol® PS, P, WF, Bo 150, FC, FG, G-100, G-20, G-35, G-500, HF, PO-100, PR-8515 and SK or from DOW under the trade name Polyethylenimin 6, 12, 18, 600, 1000.

Polyamino amides comprise both amine and amido functionalities in the main chain. Polyamino amides are manufactured by polycondensation of polyamines and dicarboxylic acids or by the Michael addition of acrylic acid esters to diamines and the subsequent polycondensation of the resulting amino acid esters. Polyamino amides that can be used as component (B2) are described by Henry Lee and Kris Neville, Handbook of epoxy resins, chapter 10, pages 10-1 to 10-23, McGraw-Hill Book Company, New York 1967, as well as by Clayton A. May, Epoxy Resins, page 469, Marcel Dekker, New York 1988 and references cited therein. In the context of the present invention, preferred polyamino amides are used that are obtained by polycondensation of aliphatic polyamines and dimerized or trimerized fatty acids. Nongrafted and grafted polyamino amides, such as those described in WO 94/29422, can also be employed. Polyamino amides are commercially available under the trade name Versamid® from Cognis, under the trade name Ruetadur from Bakelite AG or from the product series SIQ-Therm from S.I.Q. Kunstharz GmbH.

Further preferred polyamines that can be used as component (B2) are polyvinylamines. Polyvinylamines can be manufactured, for example by polymerizing N-vinyl acylamines, such as N-vinyl formamide, N-vinyl acetamide, etc. and the subsequent complete or partial hydrolysis of the amide group. Preferred polyvinylamines are commercially available from BASF under the trade name Lupamin®: 1500, 4500, 4595, 9000, 9030, 9095.

Amine terminated polyether urethanes are available, for example from Henkel under the trade name Liofol UR 9640. Further polyamines that can be employed as component (B2) are the highly branched polymers that carry amino groups at the branch points, particularly primary amino groups. A particularly preferred group of highly branched polymers used as component (B2) are the dendritic polymers that are also known as dendrimers, cascade polymers or starburst polymers. These are understood to be synthetic macromolecules that are constructed stepwise by linking 2 or more monomers with each of the already bound monomers, with the result that the number of monomeric end groups increases exponentially with each step and finally results in a spherical tree structure. Preferred dendrimers are polyamine amides (PAMAM) with primary amino functions at the branches; those of the generation $\geq 0$ are preferred. Dendrimers with the following structure are understood as generation 0: [—$CH_2N(CH_2CH_2CONHCH_2CH_2NH_2)_2]_2$. Dendrimers of generation $\geq 1$ are particularly preferred, wherein dendrimers of generation 1 have the following structure: [—$CH_2N[CH_2CH_2CONHCH_2CH_2N(CH_2CH_2CONHCH_2CH_2NH_2)_2]_2]_2$. The structures of higher generations, preferably up to generation 6 result from the above systematic synthesis from generation 0 to generation 1.

Dendrimers can be manufactured, for example, by step reactions of ammonia or suitable representatives of the abovementioned alkylenediamines of the general formula $R^4R^5N-Z-NR^6R^7$ with acrylic acid esters. In these cases $R^4$, $R^5$, $R^6$, $R^7$ mean hydrogen. Z means a linear or branched, saturated or unsaturated alkylene chain containing >2 carbon atoms. The polymer synthesis occurs by the Michael addition of the amino groups to the olefinic double bonds and condensation of amino groups with ester groups. Thus, a suitable molar excess of amine has to be chosen. Further suitable amine components for the dendrimer synthesis are found in the above-mentioned groups of the cycloalkylenediamines, the diamines that exhibit both alkyl groups and cycloalkyl groups, and the group of the amine-functionalized polyalkylene glycols. In these cases, all of the relevant amine building blocks possess 2 primary amino functions.

A further preferred group of highly branched polymers that can be employed as component (B2) results, for example, from the step reaction of acrylic acid esters with suitable representatives of the above-mentioned polyfunctional amines of the general formula $H_2N-(CH_2CH_2-NH)_x-CH_2CH_2-NH_2$ with $2 \leq x \leq 10$, such as, e.g., diethylenetriamine, triethylenetetramine, tetraethylenepentamine, pentaethylenehexamine.

Further preferred compounds that can be employed as component (B2) are manufactured by the reaction of an excess of compounds that are added according to the invention as component (B1), with the previously described compounds that are added according to the invention as component (B2) and which in addition possess at least two cyclic carbonate groups in the molecule. In these cases, a sufficient molar excess of amine in relation to cyclocarbonate has to be employed, such that the required amine functionality for the inventive use as component (B2) is present in the reaction products. The inventively employable component (B2) can also be manufactured by the reaction of an excess of the low molecular weight polyfunctional amines, mentioned above as being usable as component (B1), with cyclic carbonates, which have an average molecular weight ($M_n$) of less than 1000 g/mol, preferably 100 g/mol to 800 g/mol. In these cases, a suitable molar excess of amine in relation to cyclocarbonate has to be chosen, such that firstly the inventive molecular weight is attained and secondly the inventive amine functionality for the use as component (B2) is present. The inventively added component (B2) is added as the sole component or also as a mixture of the suitable employable compounds as the component (B2).

The inventive bonding agent system is particularly suitable as an adhesive/sealant. Accordingly, the subject matter of the invention is also a process for the manufacture of an adhesive/sealant using the inventive bonding agent system, wherein component (A) is mixed with component (B) in the ratio of the carbonate groups to primary amine groups of 30:1 to 0.2:1, preferably 10:1 to 0.4:1, particularly preferably 5:1 to 0.5:1 and particularly 2:1 to 0.6:1. When no primary amine groups are comprised in the molecule, then the ratio is applied to the secondary amine groups. Here, each of the functional groups of the components A, A1 and B1, B2 overall are to be taken into account.

In a preferred embodiment of the inventive process, the reaction between component (A) and component (B) takes place in the presence of a solvent. Basically, all solvents known to the person skilled in the art can be used as the solvent, particularly esters, ketones, halogenated hydrocarbons, alkanes, alkenes and aromatic hydrocarbons. Exemplary solvents are methylene chloride, trichloroethylene, toluene, xylene, butyl acetate, amyl acetate, isobutyl acetate, methyl isobutyl ketone, methoxybutyl acetate, cyclohexane, cyclohexanone, dichlorobenzene, diethyl ketone, di-isobutyl ketone, dioxane, ethyl acetate, ethylene glycol monobutyl ether acetate, ethylene glycol monoethyl acetate, 2-ethylhexyl acetate, glycol diacetate, heptane, hexane, isobutyl acetate, isooctane, isopropyl acetate, methyl ethyl ketone, tetrahydrofuran or tetrachloroethylene or mixtures of two or more of the cited solvents.

In a particular embodiment of the inventive process, the reaction between component (A) and component (B) takes place in the presence of a catalyst. For this, catalytic quantities of a base are added to the mixture. These types of bases and the quantities to be added are described in U.S. Pat. No. 5,977,266 and WO 02/079148. Reference is particularly made to WO 98/50345, page 3, line 1 to page 4, line 17. However, the catalyst may also be comprised in components (A) or (B). For gluing or sealing, at least one side of a substrate to be glued or sealed is coated with the mixture and the side coated in this manner is bonded with at least one additional substrate.

The inventive bonding agent system is suitable for gluing and sealing the most varied substrates. Exemplary substrates include wood, metal, glass, vegetal fibers, stone, paper, cellulose hydrate, plastics like polystyrene, polyethylene, polypropylene, polyethylene terephthalate, polyvinyl chloride, copolymers of vinyl chloride and vinylidene chloride, copolymers of vinyl acetate olefins, polyamides, particularly plastic films, metals, particularly films of aluminium, lead or copper.

In particular, the inventive bonding agent system is suitable as a two-component adhesive for gluing paper, cardboard, wood, plastic, metal or earthenware.

In a particularly preferred embodiment of the invention, the inventive bonding agent system is used as a solvent-free or solvent-containing lamination adhesive. The inventive bonding agent system can be applied to the substrate to be glued with all current application processes, for example by spraying, doctor blades, 3-4 application roll equipment in the case of the use of a solvent-free binding agent system or 2 application roll equipment in the case of the use of a solvent-containing bonding agent system. Due to its low viscosity, the inventive bonding agent system is particularly suitable for gluing temperature-sensitive plastic films, for example polyolefin films, in particular polyolefin films of polyethylene or polypropylene. Accordingly, a further subject matter of the present invention is also a process for the manufacture of composite films that are obtained by partial or complete surface gluing of at least two identical or different plastic films, with the use of the inventive bonding agent system. The application of the bonding agent system as the two-component adhesive onto the films being glued can be carried out with machinery conventionally used for this purpose, for example with customary lamination machines. A further subject matter of the invention is a composite film, manufactured according to the inventive process by using the inventive bonding agent system. The composite film is particularly suitable for packaging foodstuffs and luxury foods and medicinal products.

The inventive bonding agent system can comprise customary additives, such as plasticizers, silanes, antioxidants, UV stabilizers and anti aging compounds. Preferred plasticizers are esters of phthalic acid, for example dioctyl phthalate, ditridecyl phthalate and butyl benzyl phthalate, esters of phosphoric acid, for example tricresyl phosphate, adipates, for example dioctyl adipates, or benzoates, for example propylene glycol dibenzoate.

Amino-, epoxy- or mercaptosilanes, particularly γ-glycidyloxypropyl- or γ-aminopropyl-trimethoxysilane are used especially for improving the adhesive strength to glass, metals, etc.

Inorganic fillers, such as carbon black, calcium carbonate, titanium dioxide and the like are added to the inventive bonding agent system for use as a sealant. Highly dispersed silicas, especially pyrogenic silicas or precipitated silicas, are preferably used as the inorganic fillers due to their thixotropic effect, the thixotropic properties being retained in the inventive bonding agent system even after longer storage times.

In a further preferred embodiment of the invention, the inventive bonding agent system is used to manufacture construction foams or pourable sealing compounds.

In particular, the inventive bonding agent system is suitable as a pourable sealing compound for electrical building components such as cables, fiber optics, cover strips or plugs to protect them against the ingress of contamination, especially water, as is also needed against mechanical damage during installation or because of temperature exposure. For this, the bonding agent system preferably comprises highly dispersed silica and optionally hollow articles, for example hollow articles of glass as well as preferably a solvent based on hydrocarbons, an organic thickener based on a polymer and optionally a dispersion agent. As a pourable sealing compound, the bonding agent system is distinguished by a good thermal stability.

The inventive bonding agent system is preferred in the building industry as a construction foam for filling empty spaces and fixing building elements, because in statu nascendi it is sticky at the onset of crosslinking and adheres well to many materials, such as wood, metal, concrete, masonry. The foam formation is effected physically by low boiling blowing agents, such as halogenated hydrocarbons and/or highly volatile non-halogenated hydrocarbons, such as pentane, cyclopentane, propane, isobutene, dimethyl ether inter alia.

In the following, the invention will be described in more detail with some exemplary examples. The given quantities are in percent by weight unless otherwise stated.

EXAMPLES

Viscosity Measurements:
Melt viscosities were measured with an ICI cone plate viscometer from the Epprecht Company, cone type D.
Raw Materials:

| | |
|---|---|
| 1,3-BAC | 1,3-Bis-(aminomethyl-)cyclohexane from Mitsubishi Gas Chemicals |
| DBTL | Dibutyltin dilaurate (TINSTAB BL 277 from Akcros) |
| DETA | Diethylenetriamine from Merck |
| Glycerine carbonate | JEFFSOL glycerine carbonate from Huntsman |
| GLYMO | 3-Glycidyloxypropyltrimethoxysilane (Dynasilan GLYMO from Degussa) |
| Lupranat MIS | Diphenylmethane diisocyanate, mixture of isomers from BASF |
| MDI | 4,4'-Diphenylmethane diisocyanate (DESMODUR 44 M from Bayer) |
| MXDA | 1,3-Xylylene diamine from Mitsubishi Gas Chemicals |
| PEI | Polyethylene imine, low molecular weight, water free from Aldrich Chemical Company |
| Polyol A | Liquid polyester polyol from Henkel with an OH number of 58 |
| Polyol B | Liquid polyester polyol from Henkel with an OH number of 140 |
| Polyol C | Amorphous polyester polyol with an OH number of 43 (DYNACOLL 7150 from Degussa) |
| Polyol D | Crystalline polyester polyol with an OH number of 28 (DYNACOLL 7360 from Degussa) |
| Polyol E | Trifunctional polypropylene glycol with an OH number of 228 (VORANOL CP 755 from Dow) |

-continued

| Polyol F | Difunctional polypropylene glycol with an OH number of 5.9 (ACCLAIM 18200N from Bayer) |
| --- | --- |
| TEPA | Tetraethylenepentamine from Bayer |
| CPP-Film | Cast polypropylene from Nordenia, type PP0946.080 (thickness 50 µm) |
| PET-Film | Polyethylene terephthalate-film, type RNK 12 from Mitsubishi (thickness 12 µm) |

Example 1

In a 1 liter four-necked flask equipped with a stirrer, thermometer and an inlet and outlet valve for introducing inert gas were added 120 g polyol A, 100 g polyol B and 80 g polyol C, melted and dried for 1 hour at 120° C. under a pressure of <10 mbar. After venting with dry nitrogen, the inner temperature was lowered to 90° C. and 81.99 g MDI were added. The mixture was then further stirred at 100° C. After 1 hour the NCO number was 2.25 wt. %. 24.16 g of dried glycerine carbonate were added and stirring continued between 100 and 120° C. until the NCO number was lower than 0.1% wt. %. The resulting prepolymer had a melt viscosity of 49 Pa·s at 125° C.

Example 2

90 g of the prepolymer from Example 1 were dissolved with stirring in 100 g ethyl acetate at room temperature. Then 0.62 g DETA were added to 50 g of this solution and the mixture was homogenized for 15 minutes. This mixture was then coated onto a silicone paper with a doctor blade (gap 500 µm from Erichsen), left to dry in air at room temperature and the melt viscosity determined from time to time. The melt viscosity (measured at 125° C.) was 1.6 Pa·s after 1 hour, 13 Pa·s after 24 hours and 74 Pa·s after 4 days. After 15 days the film had an ultimate tensile strength of 6.2 N/mm$^2$ and an elongation at break of 330%.

Example 3

90 g of the prepolymer from Example 1 were dissolved with stirring in 100 g ethyl acetate at room temperature. Then 0.12 g PEI were added to 25 g of this solution and the mixture was homogenized for 15 minutes. This mixture was then coated onto a silicone paper with a doctor blade (gap 500 µm from Erichsen), left to dry in air at room temperature and the melt viscosity determined from time to time. The melt viscosity (measured at 125° C.) was 67 Pa·s after 1 hour and 123 Pa·s after 24 hours. A control test after 1 week showed that a melt viscosity could no longer be measured on the sample due to crosslinking. An overlapping adhesion of beech test pieces (Rocholl Company, length×width×thickness 100×25×5 mm, overlap length 10 mm) was carried out with the above described solution. After 14 days storage at room temperature, a tensile shear strength of 4.6 N/mm$^2$ was measured with partial break of the wood.

Example 4

101.77 g of the prepolymer from Example 1 were dissolved with stirring in 100 g ethyl acetate at room temperature. Then 0.43 g MXDA were added to 25 g of this solution and the mixture was homogenized for 15 minutes. This mixture was then coated onto a silicone paper with a doctor blade (gap 500 µm from Erichsen), left to dry in air at room temperature and the melt viscosity determined from time to time. The melt viscosity (measured at 125° C.) was 13 Pa·s after 24 hours and 51 Pa·s after 7 days.

Example 5

101.77 g of the prepolymer from Example 1 were dissolved with stirring in 100 g ethyl acetate at room temperature. Then 0.44 g 1,3-BAC were added to 25 g of this solution and the mixture was homogenized for 15 minutes. This mixture was then coated onto a silicone paper with a doctor blade (gap 500 µm from Erichsen), left to dry in air at room temperature and the melt viscosity determined from time to time. The melt viscosity (measured at 125° C.) was 5 Pa·s after 24 hours and 69 Pa·s after 7 days. After 13 days the film had an ultimate tensile strength of 4 N/mm$^2$ and an elongation at break of 380%.

Example 6

In a 1 liter four-necked flask equipped with a stirrer, thermometer and an inlet and outlet valve for introducing inert gas were added 120 g polyol A, 100 g polyol B and 80 g polyol C, melted and dried for 1 hour at 120° C. under a pressure of <10 mbar. After venting with dry nitrogen, the inner temperature was lowered to 90° C. and 81.99 g Lupranat MIS were added. The mixture was then further stirred at 100° C. After 3 hours the NCO number was 2.39 wt. %. 25.66 g of dried glycerine carbonate were then added and stirring continued between 100 and 120° C. until the NCO number was lower than 0.1 wt. %. In addition, the reaction was catalyzed by the addition of 1 drop of DBTL. The resulting prepolymer had a melt viscosity of 24 Pa·s at 125° C.

Example 7

90.13 g of the prepolymer from Example 6 were dissolved with stirring in 100 g ethyl acetate at room temperature. Then 0.597 g TEPA were added to 25 g of this solution and the mixture was homogenized for 15 minutes. This mixture was then coated onto a silicone paper with a doctor blade (gap 500 µm from Erichsen) and left to dry in air. After 17 days the film had an ultimate tensile strength of 12.6 N/mm$^2$ and an elongation at break of 302%. Test pieces of beech wood were glued together (in analogy with example 3) with the above described solution. After 14 days storage at room temperature, a tensile shear strength of 4.8 N/mm$^2$ was measured with partial break of the wood.

Example 8

In a 1 liter four-necked flask equipped with a stirrer, thermometer and an inlet and outlet valve for introducing inert gas were added 70 g polyol A, 70 g polyol B, 80 g polyol C and 80 g polyol D, melted and dried for 1 hour at 120° C. under a pressure of <5 mbar. After venting with dry nitrogen, the inner temperature was lowered to 90° C. and 58.15 g MDI were added. The mixture was then further stirred at 100° C. After 3 hours the NCO number was 1.65 wt. %. 16.61 g of dried glycerine carbonate were then added and stirring continued between 100 and 120° C. until the NCO number was lower than 0.1 wt. %. The resulting prepolymer had a melt viscosity of 56 Pa·s at 125° C.

Example 9

64.58 g of the prepolymer from Example 8 were dissolved with stirring in 100 g ethyl acetate at room temperature. Then 0.869 g Jeffamine® T 403 were added to 50 g of this solution and the mixture was homogenized for 15 minutes. Test pieces of beech wood were glued together (in analogy with Example 3) with this solution. After 14 days storage at room temperature, a tensile shear strength of 3.3 N/mm² was measured.

Example 10

64.58 g of the prepolymer from Example 8 were dissolved with stirring in 100 g ethyl acetate at room temperature. Then 0.098 g PEI were added to 25 g of this solution and the mixture was homogenized for 15 minutes. This mixture was then coated onto a silicone paper with a doctor blade (gap 500 μm from Erichsen), left to dry in air at room temperature and the melt viscosity determined from time to time. The melt viscosity (measured at 125° C.) was 44 Pa·s after 24 hours and 113 Pa·s after 7 days. After 21 days the film had an ultimate tensile strength of 5 N/mm² and an elongation at break of 160%. Test pieces of beech wood were glued together (in analogy with example 3) with the above described solution. After 14 days storage at room temperature, a tensile shear strength of 6 N/mm² was measured with partial break of the wood.

Example 11

99 g of the prepolymer from Example 8 were dissolved with stirring in 100 g ethyl acetate at room temperature. Then 0.124 g PEI were added to 25 g of this solution and the mixture was homogenized for 15 minutes. This mixture was then coated onto a PET film with a spiral coating blade (K Hand Coater 620, K-Stab no. 1 from the Erichsen Company) and the solvent was evaporated away with a 3 minute blowing and fanning with a hair-dryer (type 298 from the Hanns Company, heat level 1, distance from the film ca. 20 cm). Immediately afterwards, a sheet of CPP film whose surface had been corona treated, was applied and forcefully pressed on evenly and free of bubbles with a Pattex press roller (Henkel) and stored at room temperature. Strips of 15 mm width were then cut out of this composite film and the adhesive strength of the composite was determined with a 90° peel test on a tensile testing machine (Instron 4301). The test speed was 100 mm/min. After 4 days storage at room temperature, a value of 16 N/15 mm was measured and a tear in the PET film was observed.

Example 12

99 g of the prepolymer from Example 8 together with 1 g GLYMO were dissolved with stirring in 100 g ethyl acetate at room temperature. Then 0.124 g PEI were added to 25 g of this solution and the mixture was homogenized for 15 minutes. This mixture was then coated onto the aluminum side of a aluminum/PET composite film (aluminum foil, 12 μm thick from Norsk Hydro; PET-film, 12 μm thick, type RNK 12 from Mitsubishi, laminated with Liofol UK 3640/6800 from Henkel) with a spiral coating blade (K Hand Coater 620, K-Stab no. 1 from the Erichsen Company) and the solvent was evaporated away with a 3 minute blowing and fanning with a hair-dryer (type 298 from the Hanns Company, heat level 1, distance from the film ca. 20 cm). Immediately afterwards, a CPP film whose surface had been corona treated, was applied and forcefully pressed on evenly and free of bubbles with a Pattex press roller (Henkel) and stored at room temperature. Strips of 15 mm width were then cut out of this composite film and the adhesive strength of the composite of polypropylene against aluminum was determined with a 90° peel test on a tensile testing machine (Instron 4301). The test speed was 100 mm/min. After 14 days storage at room temperature, a value of 11 N/15 mm was measured and a tear in the aluminum/PET composite film was observed.

Example 13

In a 1 liter four-necked flask equipped with a stirrer, thermometer and an inlet and outlet valve for introducing inert gas were added 100 g polyol E and dried for 0.5 hours at 120° C. under a pressure of <5 mbar. After venting with dry nitrogen, the inner temperature was lowered to 50° C. and 106.8 g Lupranat MIS were added. The mixture was then further stirred at 100° C. After 1 hour the NCO number was 8.88 wt. %. 51.61 g of dried glycerine carbonate were then added and stirring continued between 100 and 120° C. until the NCO number was lower than 0.1 wt. %. The resulting prepolymer had a melt viscosity of 40 Pa·s at 125° C.

Example 14

0.56 g TEPA were added to 25 g of an ethyl acetate solution of 7.22 g of prepolymer from Example 6 and 1.45 g of prepolymer from Example 13 and the mixture was homogenized for 15 minutes. This mixture was then coated onto a silicone paper with a doctor blade (gap 500 μm from Erichsen), left to dry in air at room temperature and the melt viscosity determined from time to time. The melt viscosity (measured at 125° C.) was 25 Pa·s after 1 hour, 64 Pa·s after 28 hours and 128 Pa·s after 6 days. Test pieces of beech wood were glued together (in analogy with example 3) with the above described solution. After 14 days storage at room temperature, a tensile shear strength of 6 N/mm² was measured with partial break of the wood.

Example 15

In a 1 liter four-necked flask equipped with a stirrer, thermometer and an inlet and outlet valve for introducing inert gas were added 400 g polyol F and dried for 1 hours at an internal temperature of 80° C. under a pressure of <5 mbar. After venting with dry nitrogen, 10.53 g of MDI were added. The mixture was then further stirred at 100° C. After 2 hours the NCO number was 0.38 wt. %. 2.48 g of dried glycerine carbonate were then added and stirring continued between 80 and 85° C. until the NCO number was lower than 0.1 wt. %. The resulting prepolymer had a melt viscosity of 63 Pa·s at 125° C. 1 g of PEI was stirred into 100 g of the resulting prepolymer. Test pieces of beech wood were glued together (in analogy with example 3) with this mixture. After 14 days storage at room temperature, a tensile shear strength of 0.8 N/mm² was measured. This mixture is suitable inter alia as a sealant.

Example 16

In a 1 liter four-necked flask equipped, with a stirrer, thermometer and an inlet and outlet valve for introducing inert gas were added 120 g polyol A, 100 g polyol B, 80 g polyol C and 10 g polyol E, and dried for 1 hour at 120° C. under a pressure of <10 mbar. After venting with dry nitrogen, the inner temperature was lowered to 90° C. and 81.99 g Lupranat MIS were added. The mixture was then further stirred at 100° C. After 2 hours the NCO number was 2.24 wt. %. 24.68 g of dried glycerine carbonate were then added and stirring continued between 100 and 120° C. until the NCO number was lower than 0.1 wt. %. In addition, the reaction was catalyzed by the addition of 1 drop of DBTL. The resulting prepolymer had a melt viscosity of 38 Pa·s at 125° C.

Example 17

101.82 g of the prepolymer from Example 16 were dissolved with stirring in 100 g ethyl acetate at room temperature. Then 0.126 g PEI were added to 25 g of this solution and the mixture was homogenized for 15 minutes. This mixture was then coated onto a silicone paper with a doctor blade (gap 500 μm from Erichsen), left to dry in air at room temperature and the melt viscosity determined from time to time. The melt viscosity (measured at 125° C.) was 20 Pa·s after 24 hours. Overlapped test pieces of beech wood were glued together (in analogy with example 3) with the above described solution. After 14 days storage at room temperature, a tensile shear strength of 5 N/mm² was measured.

Example 18

In a 1 liter four-necked flask equipped with a stirrer, thermometer and an inlet and outlet valve for introducing inert gas were added 80 g polyol A, 80 g polyol B and 100 g polyol D, and dried for 1 hour at 120° C. under a pressure of <10 mbar. After venting with dry nitrogen, the inner temperature was lowered to 90° C. and 63.25 g MDI were added. The mixture was then further stirred at 100° C. After 1 hour the NCO number was 2.17 wt. %. 19.72 g of dried glycerine carbonate were then added and stirring continued between 100 and 120° C. until the NCO number was lower than 0.1 wt. %. The resulting prepolymer had a melt viscosity of 14 Pa·s at 125° C.

Example 19

62.85 g of the prepolymer from Example 18 were dissolved with stirring in 100 g ethyl acetate at room temperature. Then 0.097 g PEI were added to 25 g of this solution and the mixture was homogenized for 15 minutes. This mixture was then coated onto a silicone paper with a doctor blade (gap 500 μm from Erichsen), left to dry in air at room temperature and the melt viscosity determined from time to time. The melt viscosity (measured at 125° C.) was 22 Pa·s after 24 hours. Overlapped test pieces of beech wood were glued together (in analogy with example 3) with the above described solution. After 14 days storage at room temperature, a tensile shear strength of 6.6 N/mm² was measured with partial break of the wood.

What is claimed is:

1. A bonding agent system comprising at least component (A) and component (B), wherein:
   a) component (A) comprises at least one compound with at least two cyclic carbonate groups, with component (A) having an average molecular weight ($M_n$) of at least 1000 g/mol; and
   b) component (B) comprises at least one compound with at least one ($NH_2$)— atom group and at least one (NHR—)-atom grouping, wherein R is H, an alkyl group or an aryl group;
   wherein the ratio of carbonate groups to $NH_2$ groups is 5:1 to 0.5:1.

2. The bonding agent system according to claim 1, wherein component (A) has an average molecular weight ($M_n$) of 1500 g/mol to 100,000 g/mol.

3. The bonding agent system according to claim 1, wherein component (A) comprises a polymer carrying at least two cyclic carbonate groups selected from the group of fat chemical compounds, polyethers, polyether polyols, polyesters, polyester polyols, polycarbonates, polycarboxylic acids, polyacrylates, polymethacrylates, polyamides, polyamines, polyurethanes and mixtures thereof.

4. The bonding agent system according to claim 1, wherein component (A) comprises a reaction product of a cyclic hydroxyalkyl carbonate with a polymer, carrying an anhydride group, $C_1$-$C_4$-alkyl ester group or isocyanate group.

5. The bonding agent system according to claim 4, wherein the cyclic hydroxyalkyl carbonate has a 5-membered or 6-membered carbonate ring.

6. The bonding agent system according to claim 1, wherein component (A) comprises an addition product of carbon dioxide to a polymer carrying an epoxide group.

7. The bonding agent system according to claim 1, wherein component (A) is additionally comprised of a compound carrying a cyclic carbonate group with an average molecular weight ($M_n$)<1000 g/mol in an amount of up to 60 wt. % based on component (A).

8. The bonding agent system according to claim 1, wherein component (B) is comprised of at least one of component (B1) or component (B2) and wherein component (B1) has at least two (—NHR—)-atom groupings and an average molecular weight ($M_n$) of 60 g/mol to 500 g/mol and component (B2) has at least two (—NHR—)-atom groupings and an average molecular weight ($M_n$) of >500 g/mol.

9. The bonding agent system according to claim 8, wherein component (B2) has an average molecular weight ($M_n$) of 800 g/mol to 2,000,000 g/mol.

10. The bonding agent system according to claim 8, wherein component (B1) is selected from the group consisting of alkylenediamines, cycloalkylenediamines, amino functionalized polyalkylene glycols and compounds of the general formula $H_2N$—$(CH_2CH_2$—$NH)_x$—$CH_2CH_2$—$NH_2$, with $2 \leq x \leq 10$.

11. The bonding agent system according to claim 8, wherein component (B2) is a polymer selected from the group consisting of polyamines, polyimines, polyethers, polyamides, polyamino amides, polyurethanes, polyolefins, polyvinylamines and mixtures thereof.

12. The bonding agent system according to claim 8, wherein component (B2) is a highly branched polymer.

13. The bonding agent system according to claim 1, wherein component (A) comprises a reaction product of glycerine carbonate with an isocyanate group-containing polyurethane prepolymer.

14. The bonding agent system according to claim 1, wherein component (B) comprises at least one compound of the general formula $H_2N$—$(CH_2CH_2NH)_x$—$CH_2CH_2$—$NH_2$, with $2 \leq x \leq 10$.

15. The bonding agent system according to claim 1, wherein component (B) comprises at least one polyimine.

16. The bonding agent system according to claim 1, wherein component (B) comprises at least one amino functionalized polyalkylene glycol.

17. The bonding agent system according to claim 1, wherein component (B) comprises at least one cycloalkylene diamine.

18. The bonding agent system according to claim 1, wherein component (A) comprises a reaction product of glycerine carbonate with an isocyanate group-containing polyurethane prepolymer and component (B) comprises at least one member selected from the group consisting of amino functionalized polyalkylene glycols, cycloalkylene diamines, polyimines, compounds of the general formula $H_2N$—$(CH_2CH_2$—$NH)_x$—$CH_2CH_2$—$NH_2$, with $2 \leq x \leq 10$, and alkylenediamines.

19. A process for manufacturing an adhesive/sealant using the bonding agent system according to claim 1, wherein component (A) is mixed with component (B) in a ratio of carbonate groups to primary amine groups of 30:1 to 0.2:1, wherein in the absence of primary amine groups the mixing ratio is to be applied to secondary amine groups.

20. A method of bonding a first substrate and a second substrate, said method comprising using the bonding agent system according to claim 1.

21. The method of claim 20, wherein component (A) and component (B) are mixed to form a mixture and said mixture is coated on at least one side of said first substrate before bonding said first substrate to said second substrate.

22. The method of claim 20, wherein both the first substrate and the second substrate are plastic films, which may be identical to or different from each other.

23. A composite film produced by the method of claim 20.

* * * * *